US008699050B2

(12) United States Patent
Tomita et al.

(10) Patent No.: US 8,699,050 B2
(45) Date of Patent: Apr. 15, 2014

(54) IMAGE FORMING DEVICE, IMAGE FORMING METHOD, AND IMAGE FORMING PROGRAM

(75) Inventors: Atsushi Tomita, Toyohashi (JP);
Kenichi Sawada, Toyohashi (JP);
Katsushi Sukigara, Hoi-gun (JP);
Shoko Haba, Toyokawa (JP);
Takatsugu Kuno, Hoi-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1038 days.

(21) Appl. No.: 12/477,173

(22) Filed: Jun. 3, 2009

(65) Prior Publication Data
US 2009/0310178 A1 Dec. 17, 2009

(30) Foreign Application Priority Data

Jun. 12, 2008 (JP) ................. 2008-154013

(51) Int. Cl.
*G06F 3/12* (2006.01)
*G06K 15/00* (2006.01)
(52) U.S. Cl.
USPC ........ 358/1.14; 358/1.13; 358/1.15; 358/1.16
(58) Field of Classification Search
None
See application file for complete search history.

(56) References Cited

U.S. PATENT DOCUMENTS

| 5,355,413 | A | 10/1994 | Ohno | |
|---|---|---|---|---|
| 2005/0100378 | A1* | 5/2005 | Kimura et al. | 400/76 |
| 2006/0001898 | A1* | 1/2006 | Maeshima et al. | 358/1.14 |
| 2006/0055968 | A1* | 3/2006 | Sato et al. | 358/1.15 |

FOREIGN PATENT DOCUMENTS

| JP | 5-250326 A | 9/1993 |
|---|---|---|
| JP | 2000-272206 | 10/2000 |
| JP | 2001-216269 A | 8/2001 |
| JP | 2006-264342 | 10/2006 |
| JP | 2007-004292 | 1/2007 |
| JP | 2007-320166 | 12/2007 |
| JP | 2008-009835 | 1/2008 |
| JP | 2008-102851 | 5/2008 |

OTHER PUBLICATIONS

Notification of Reason(s) for Refusal issued in the corresponding Japanese Patent Application No. 2008-154013 dated Mar. 23, 2010, and an English Translation thereof.

* cited by examiner

*Primary Examiner* — King Poon
*Assistant Examiner* — Vincent Peren
(74) *Attorney, Agent, or Firm* — Buchanan Ingersoll & Rooney PC

(57) ABSTRACT

An image forming device for executing an authentication print job including: a communication interface unit for receiving print data; a job data holding unit for holding job data based on the print data for the authentication print job; a user authentication unit for outputting the result of the user authentication to a control unit; a job execution unit for executing a job based on the job data; a job list generating unit for generating a list of the authentication print jobs; a display unit for displaying the list; and the control unit for, in receiving the result of the user authentication, acquiring a number of the authentication print jobs of the user authenticated by the user authentication, wherein, when the number is greater than or equal to a predetermined number, the control unit causes the job list generating unit to generate the list of the authentication print jobs of the authenticated user, the display unit to display the list, and the job execution unit to execute the authentication print job of the authenticated user.

7 Claims, 12 Drawing Sheets

Fig.6

REGISTERED USER MANAGEMENT TABLE    55

| USER NAME | PASSWORD | AUTHENTICATION DATA FOR AN AUTHENTICATION PRINT |
|---|---|---|
| Ito | QWER019 | ito. dat |
| Sato | ASDF823 | sato. dat |
| Yamada | ZXCV746 | yamada. dat |

55R1 → Ito row
55R2 → Sato row
55R3 → Yamada row

AUTHENTICATION PRINT JOB DATA MANAGEMENT TABLE 57

| JOB ID | USER NAME | DOCUMENT NAME | RECEIVED DATE AND TIME | JOB DATA NAME |
|---|---|---|---|---|
| 0001 | Yamada | DOCUMENT 1 | 9:00 8/10 2007 | yam1. bin |
| 0003 | Ito | DOCUMENT 2 | 9:10 8/10 2007 | ito1. bin |
| 0004 | Sato | DOCUMENT 3 | 9:15 8/10 2007 | sat1. bin |
| 0007 | Yamada | DOCUMENT 4 | 9:20 8/10 2007 | Yam2. bin |

57R1 → (row 1)
57R2 → (row 2)
57R3 → (row 3)
57R4 → (row 4)

STATUS MONITORING TABLE                                157

| JOB ID | USER NAME | DOCUMENT NAME | STATUS |
|--------|-----------|---------------|--------|
| 0008 | Public | DOCUMENT 5 | IN EXECUTION |
| 0009 | Ito | DOCUMENT 6 | IN STANDBY (EXECUTION QUEUEING) (1) |
| 0010 | Suzuki | DOCUMENT 7 | IN STANDBY (EXECUTION QUEUEING) (2) |

157R1, 157R2, 157R3

157C1  157C2  157C3  157C4

IMAGE FORMING DEVICE, IMAGE FORMING METHOD, AND IMAGE FORMING PROGRAM

This application is based on an application No. 2008-154013 filed in Japan, the contents of which are hereby incorporated by reference.

BACKGROUND OF THE INVENTION

1. Field of the Invention

The present invention relates to an image forming device, an image forming method, and an image forming program executed in the image forming device, in particular to an image forming device, an image forming method, and an image forming program which requires user authentication to start a printout process.

2. Description of the Related Art

In recent years, an image forming device is connected with a plurality of information processing devices by way of a network, and is shared by a plurality of users who use such plural information processing devices. Here, the image forming device includes a digital complex machine (MultiFunction Peripheral (MFP), Scan Print Copy (SPC), or All In One (AIO)) having at least two or more functions of a printer, a facsimile, a copy machine, a scanner, and the like. The information processing device includes a personal computer (PC), and the like. The image forming device and the information processing device are connected so as to be communicable to each other by way of a network such as local area network (LAN) and the Internet, and constitute an image forming system. The image forming system can be constituted by connecting one image forming device to one information processing device at one to one in the minimum configuration. Nowadays, however, a large-scale image forming system is often built up, in which a plurality of image forming devices and a plurality of information processing devices are connected to each other.

In the above-described image forming system, when a user attempts to output a printed material of a desired document from an image forming device, the user specifies a data file of the document by operating the information processing devices, specifies the image forming device to execute the printout of the document, and finally inputs an execute instruction of the printout to the information processing device. The data file of the document mentioned above is a data file stored in a storage region of the image forming system.

The information processing device transmits print data including various data of settings related to the printout process and the content of the document data file to the specified image forming device. The image forming device receives the print data transmitted, creates job data from the print data, and executes a printout process based on the job data created. The printed material of the document is then discharged from a paper discharge tray of the image forming device. The user can then go to the image forming device and collect the discharged printed material of the document.

In the image forming system having above described configuration, the user may not always be near the image forming device at the time point when the printed material of the document is discharged from the image forming device. Rather, since the image forming device is shared by the plurality of users, another user may be near the image forming device. Thus, ensuring information security related to the printed material of the document discharged from the image forming device is a problem in such image forming system.

In relation to such image forming device connected to the network and shared by the plurality of users, an image forming device is proposed in which the user performs user authentication in the vicinity of the image forming device to cause the image forming device to start the execution of the printout process of the document, and the execution of the printout process of the document is started only after the user authentication is successfully completed, in order to ensure information security related to the printed material of the document discharged by the image forming device. In such image forming device, the job data based on the relevant print data is not immediately queued even if the print data requesting for the execution of the printout process is received, but instead, such job data is retained in a temporarily held state. Only after successful completion of the user authentication, of the jobs in the temporarily held state, the job registered by the user who has succeeded the user authentication is queued, and the appropriate printout process is started. Such printout process is well known as "authentication print" or "confidential print."

Plural proposals have already been made for specific user authentication methods. The methods proposed includes: a method of inputting a user name and a password to a device through an inputting means; a method of using an IC card for information for specifying the user to be held as data and an IC card reader; and a method of using a biometrics authentication for identifying the user by using behavioral and physical features of the user. The biometrics authentication is a generic term for the authentication method of identifying and checking an individual by using physical features such as patterns of fingerprint, vein, and iris of an individual, or behavioral features.

The following patent documents will be introduced as document examples disclosing the related art of user authentication.

JP 05-250326 A discloses an authentication method and an authentication system using an IC card and a terminal device. In the authentication method, a plurality of authentication codes associated with time information is used.

In the authentication method mentioned just above, one of the terminal device or the IC card configuring the authentication system transmits to the other a random number. The other one of the terminal device or the IC card of the authentication system receives this random number, encrypts the random number by using one, as an encryption key, of the plurality of authentication codes, and creates authentication data by using the encrypted random number. The other one also transmits a predetermined signal to the former one, and transmits the authentication data to the former one after a predetermined time interval has just elapsed. In this process, the predetermined time interval has a characteristic time interval according to the time information associated with the authentication code used as an encryption key in the creation of the authentication data.

One of the terminal device or the IC card receives the predetermined signal and the authentication data. The relevant one derives the time interval between a reception time of the predetermined signal and a reception time of the authentication data, selects one authentication code from the plurality of authentication codes based on the derived time interval, and encrypts the random number by using the selected authentication code as an encryption key. The random number encrypted by the relevant one device and the authentication data received by the relevant one device are compared and the authentication is executed.

In the authentication method of JP 05-250326 A, the authentication can be completed without transmitting or receiving address information for specifying the authentication code used as the encryption key between the terminal device and the IC card. The address in which the authentication code is held and used for the authentication is thereby prevented from leaking outside.

JP 2001-216269 A discloses an authentication device. The authentication device includes a proximate sensor for detecting the presence of a user, an imaging unit for acquiring an image of the user, and an authentication unit for performing authentication by using biological features of the user extracted from the image acquired by the imaging unit, and outputting the authentication result.

In the authentication device disclosed in JP 2001-216269 A, the user does not need to start the procedure related to the authentication on his/her own, and the authentication result will not be invalidated unless the user moves away from the authentication device, wherein the authentication result is automatically invalidated when the user moves away from the authentication device. In this manner, the user is not required to perform the operations necessary for the authentication, and the security is also reliably ensured in the authentication device disclosed in JP 2001-216269 A.

Thus, not a few documents related to the user authentication method have been proposed.

The user authentication method using the IC card and the IC card reader, and the user authentication method using biometrics authentication can cut out the effort of the user to input the user name and the password to the image forming device. Thus, such methods are expected to contribute to enhancement in operability of the "authentication print."

The job data set with the authentication print printout process is subjected to a process of changing from the temporarily stored state (temporarily suspended state or held state) to the execution queueing state (state placed in queue) only after the user authentication is completed successfully. However, such process is a process internally and automatically carried out in the image forming device. Thus, in the conventional image forming device, even the user who has carried out the user authentication cannot check whether the authentication print job has been appropriately processed until all the printed materials are discharged. Furthermore, even if the authentication print job to be queued in response to the user authentication such as one authentication print job of the plurality of authentication print jobs is not queued due to an accidental event of some kind, the user recognizes such fact only after the completion of discharge of the printed material.

That is, in the conventional image forming device, it is difficult even for the user who has registered the authentication print job and completed the user authentication to immediately recognize that the authentication print job is in what state. In the conventional image forming device, the user is requested at least to perform an operation of inquiring the current state of his/her authentication print job through a user interface and the like of the image forming device. In addition, an operation of logging in the image forming device to input the operation for the inquiring is sometimes necessary. Such cumbersome operation system is effective in ensuring security of the printed material related to the authentication print job. However, such operation system has problems from the standpoint of operability. Therefore, it can hardly be said that the conventional image forming device realizes a user friendly human-machine interface with respect to the authentication print. In some cases, significant lowering in productivity also occurs.

SUMMARY OF THE INVENTION

In view of the above problem, it is an object of the present invention to provide an image forming device in which the operability and the productivity are enhanced while ensuring a security related to an authentication print job to the same extent as the conventional image forming device, a method of image formation in the image forming device, and a program for image formation.

In one aspect, the present invention relates to an image forming device which is arranged to execute an authentication print job being a print job in which a user authentication is performed using a predetermined authentication device and a start of execution of a printout process is determined based on a result of the user authentication. The image forming device includes: a communication interface unit which is arranged to receive print data related to a print job; a job data holding unit which is arranged to hold job data based on the print data for the authentication print job; a user authentication unit which is arranged to output the result of the user authentication using the predetermined authentication device to a control unit; a job execution unit which is arranged to execute a job based on the job data; a job list generating unit which is arranged to generate a list of authentication print jobs related to the job data held by the job data holding unit; a display unit which is arranged to display the list of authentication print jobs generated by the job list generating unit; and the control unit which is arranged to, in receiving the result of the user authentication outputted by the user authentication unit, acquire a number of authentication print jobs related to the job data held by the job data holding unit of the user authenticated by the user authentication using the predetermined authentication device, wherein, when the number of the authentication print jobs of the authenticated user acquired by the control unit is greater than or equal to a predetermined number, the control unit causes the job list generating unit to generate the list of authentication print jobs of the authenticated user, the display unit to display the list of authentication print jobs of the authenticated user generated by the job list generating unit, and the job execution unit to execute the authentication print job of the authenticated user.

In another aspect, the present invention relates to an image forming method in an image forming device which is arranged to execute an authentication print job being a print job in which a user authentication is performed using a predetermined authentication device and a start of execution of a printout process is determined based on a result of the user authentication. The image forming method includes: receiving print data related to a print job by a communication interface unit; holding job data based on the print data for the authentication print job by a job data holding unit; outputting the result of the user authentication using the predetermined authentication device to a control unit by a user authentication unit; acquiring, in receiving the result of the user authentication outputted by the user authentication unit, a number of authentication print jobs related to the job data held by the job data holding unit of the user authenticated by the user authentication using the predetermined authentication device by the control unit; and determining whether or not the acquired number of the authentication print jobs of the authenticated user is greater than or equal to a predetermined number by the control unit; wherein, when determined that the acquired number of the authentication print jobs of the authenticated user is greater than or equal to the predetermined number, the control unit causes the job list generating unit to generate the list of authentication print jobs of the authenticated user, the display unit to display the list of authentication print jobs of the authenticated user generated by the job list generating unit, and the job execution unit to execute the authentication print job of the authenticated user.

In still another aspect, the present invention relates to a computer readable medium storing an image forming program executable by a computer of an image forming device which is arranged to execute an authentication print job being a print job in which a user authentication is performed using a predetermined authentication device and a start of execution of a printout process is determined based on a result of the user authentication. The image forming program includes: code which causes a communication interface unit to receive print data related to a print job; code which causes a job data holding unit to hold job data based on the print data for the authentication print job; code which causes a user authentication unit to output the result of the user authentication using the predetermined authentication device to a control unit; code which causes the control unit to acquire, in receiving the result of the user authentication output by the user authentication unit, a number of authentication print jobs related to the job data held by the job data holding unit of the user authenticated by the user authentication using the predetermined authentication device; and code which causes the control unit to determine whether or not the acquired number of the authentication print jobs of the authenticated user is greater than or equal to a predetermined number, wherein, when determined that the acquired number of the authentication print jobs of the authenticated user is greater than or equal to the predetermined number, the control unit causes the job list generating unit to generate the list of authentication print jobs of the authenticated user, the display unit to display the list of authentication print jobs of the authenticated user generated by the job list generating unit, and the job execution unit to execute the authentication print job of the authenticated user.

Other objects and further features of the present invention will be apparent from the following detailed description when read in conjunction with the accompanying drawings.

BRIEF DESCRIPTION OF THE DRAWINGS

FIG. 6 is an exemplary diagram of a registered user management table;

FIG. 7 is an exemplary diagram of an authentication print job data management table;

FIG. 12 is an exemplary diagram of a status monitoring table.

DETAILED DESCRIPTION OF THE PREFERRED EMBODIMENTS

Figure 1:
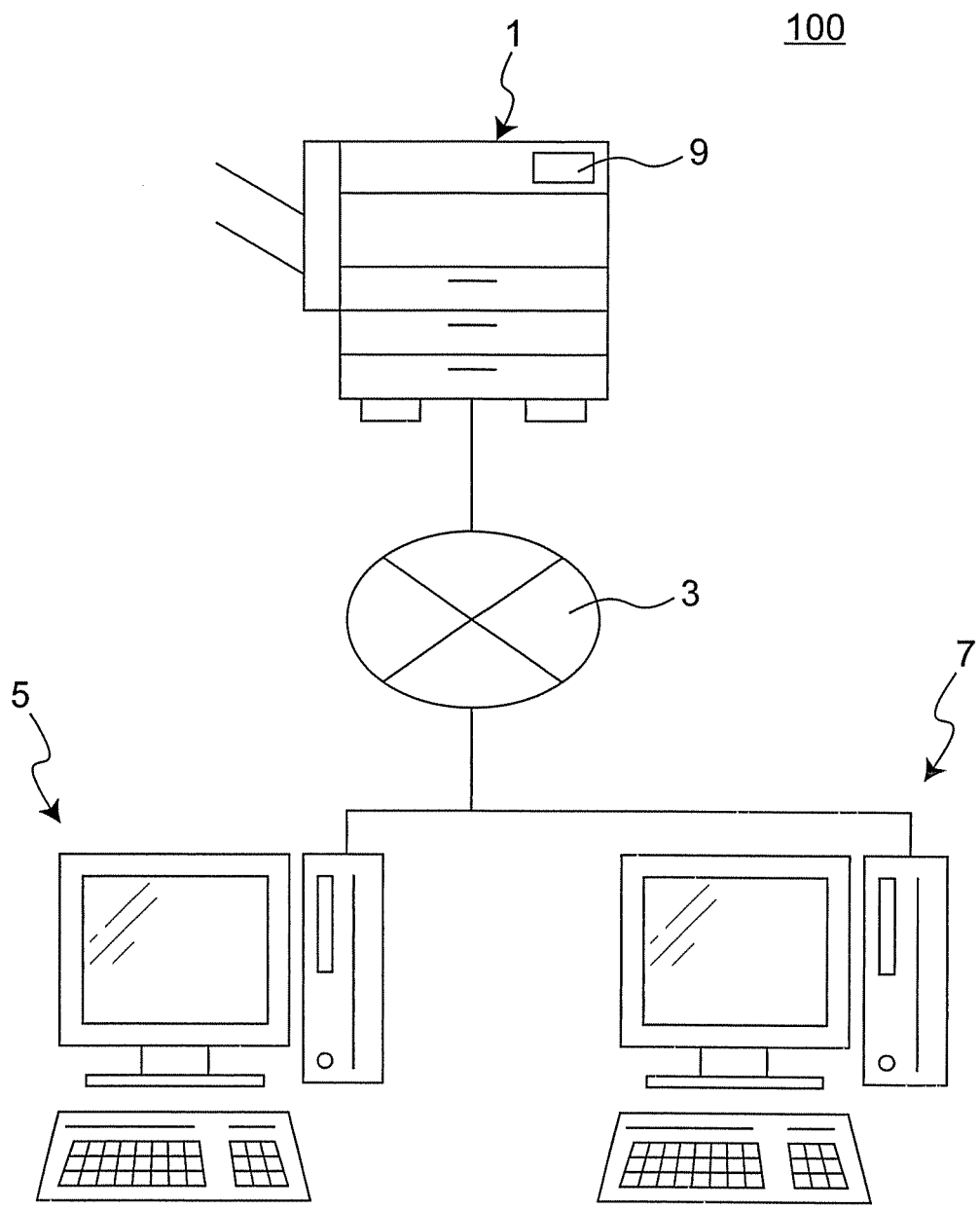
FIG. 1 is a schematic diagram of a configuration an image forming system 100.

The present invention provides an image forming device in which the security related to an authentication print job is ensured to the same extent as the conventional image forming device and in which operability and productivity are enhanced, a method of image formation in the image forming device, and a program for image formation.

The image forming device according to the present invention can provide a user friendly human-machine interface in executing the authentication print, and thus has effects of enhancing the operability and preventing unforeseen lowering in the productivity.

The embodiment according to the present invention relates to an image forming device, a method of image formation used in the image forming device, and a program for image formation.

The image forming device according to the embodiment of the present invention is an image forming device capable of executing "authentication print" printout process.

<Regarding "Authentication Print (Authentication & Print)" Printout Process>

Prior to specifically describing the embodiment of the present invention, the "authentication print (authentication & print)" printout process will be briefly described. The "authentication (&) print" printout process refers to a printout mode in which the image forming device performs user authentication using a predetermined authentication means, and starts the printout of the relevant job only after the user authentication is successfully completed when the image forming device executes a job involving the printout process. That is, the image forming device, in the authentication print printout, does not immediately queue the job data related to the relevant job even when accepting the registration of the job. Instead, the image forming device continues to hold the data related to the printout in a temporarily stored (suspended) state, and changes the relevant data to the execution state or the execution queueing (standby) state (execute process of queuing the relevant data) after confirming the success of the user authentication. Here, the user authentication is, for example, the user authentication on the user who registered the job. The authentication print printout process differs from the "normal" printout process in that the printout process does not start until the user authentication using the predetermined authentication means is successful. The authentication print is also referred to as touch & print.

In the image forming device according to the embodiment of the present invention, the image forming device displays a list of authentication print jobs on the user interface when a number of authentication print jobs is greater than or equal to a predetermined number, for example, when a plurality (two or more) of authentication print jobs related to the successfully completed user authentication is in the temporarily stored state (temporarily suspended state).

The user selects only the authentication print job desired to be printed out from the plurality of authentication print jobs, and causes the image forming device to start the execution of the printout related to the selected authentication print job.

The user also can specify the execution order of the printout in the above selection.

The user can obtain only the printed material desired by the user in the desired order from the plurality of authentication print jobs. In other words, the user can instruct not to printout some of the authentication print jobs in the temporarily suspended state in the image forming device.

When the number of authentication print jobs is less than the predetermined number, for example, when a single authentication print job related to the successfully completed user authentication is in the temporarily stored state (temporarily suspended state), the image forming device immediately queues the relevant authentication print job without displaying a list of authentication print jobs, and completes the printout process as fast as possible.

The predetermined number is, for example, two. However, this value can be arbitrarily set according to a mode of the usage of the image forming device, and is not a matter closely related to the principle of the present invention. The predetermined number merely needs to be a natural number of greater than or equal to two such as three, four, and five.

Therefore, the image forming device according to the embodiment of the present invention has a configuration of determining whether or not the number of authentication print jobs to be changed from the temporarily suspended state to the execution/execution queueing state in response to the success of the user authentication is greater than or equal to the predetermined number, and also has a configuration capable of automatically presenting information related to the job to the user and accepting the input of instruction from the user during a period until the start of execution of the printout process. In this case, the operation for logging in newly or once again the image forming device is not required when the user inputs the instruction to the image forming device. Thus, the user selects his/her authentication print job to execute, defines the execution order, and instructs the execution to the image forming device with a simple and convenient manner.

According to such configuration, the image forming device according to the embodiment of the present invention succeeds in enhancing the operability and the productivity of the image forming device when executing the authentication print printout process.

An image forming device according to another embodiment of the present invention notifies the user that the authentication print job has changed from the suspended state to the execution standby state (queued state) when the image forming device has another job in the execution process or in execution standby state even if less than the predetermined number such as single authentication print job related to the user who successfully has completed the user authentication is in the temporarily suspended state. Thus, in the image forming device according to the present invention, the user can reliably recognize that his/her authentication print job is appropriately processed in the image forming device without waiting for the printed material to be discharged. The image forming device according to the present invention thus has a user-friendly human-machine interface.

Obviously, the image forming device according to the present invention can execute the printout process which is not the "authentication print", that is, the "normal" printout process. In the "normal" printout process, the image forming device creates job data with respect to the inputted print data and immediately executes the printout process. The switch between the "authentication print" and the "normal" printout process can be made in units of jobs based on the set parameter value contained in the print data. The switch may be performed based on information separately inputted to the image forming device in place of/in addition to the set parameter value contained in the print data.

In the embodiment illustrated below, the print data is inputted from an external information processing device to the image forming device via a network. The parameter setting for causing the image forming device to "authentication print" the job related to the relevant print data is made by having the user set a predetermined parameter in the external information processing device.

In the present invention, however, the manner for inputting the print data to the image forming device is not limited to the inputting manner via the network as described above. Other inputting manners including a manner in which the user directly registers the job to the image forming device, a manner in which the user registers the job to the image forming device using a portable storage medium etc., or the like are within the scope of the present invention.

Preferred embodiments of the present invention will be described below with reference to the accompanying drawings.

First Embodiment

FIG. 1 is a schematic diagram of a configuration of an image forming system 100 according to a first embodiment of the present invention.

<Image Forming System>

The image forming system 100 includes a digital complex machine (MFP) 1 as the image forming device, and a plurality of information processing devices (personal computer (PC)) 5, 7 as a terminal device of the image forming device 1. The MFP 1 and the plurality of PCs 5, 7 are communicably connected with each other via a network 3. The network 3 is the Internet, the local area network (LAN), and the like. The network 3 may be any one of a network using a dedicated line, a network using a general line, and a network using a wireless communication channel; or a network configured using a combination of at least two of the above.

The digital complex machine 1 configures the image forming device according to the first embodiment. The digital complex machine (MFP) is an image forming device intensively having a plurality of functions such as print function, copy function, scanner function, facsimile function, e-mail transmission function, and the like. The MFP 1 forms a document image on a printing medium such as paper, the image being scanned in the MFP 1 or being generated from the print data received through the network 3. Here, the print data is data including the drawing command that can be processed by the MFP 1 and the data of the document to be printed, which is generated through a printer driver's processing to the drawing commands issued by an operating system or an application program running on the terminal device such as the PC 5. The drawing command contained in the print data may be described using a page description language that can be processed by the MFP 1. Furthermore, the data of the document may be a data file of a document having a file format such as PDF (Portable Document Format), TIFF (Tagged Image File Format), JPEG (Joint Photographic Experts Group), XPS (XML Paper Specification), and the like. The MFP 1 also can provide other equipment with the image data obtained by scanning the image via the network 3. In addition, the MFP 1 includes an authentication unit 9 in its own machine as predetermined authentication means for performing user authentication in the authentication print printout process.

However, it is to be noted that the image forming device according to the present embodiment is only needed to be capable of receiving job data based on print data transmitted from the terminal device through the network, and executing the printout process. Alternatively, the image forming device according to the present embodiment may generate job data from received print data. In this case, the terminal device may transmit either the print data itself or the job data based on the print data to the image forming device. The authentication unit 9 does not necessarily need to be incorporated in the MFP 1 body. The authentication unit 9 may be connected to the MFP 1 and arranged in the vicinity thereof.

The specific configuration of the authentication unit 9 may be appropriately selected so as to adapt to methodology performed in the user authentication used in the MFP 1. The authentication unit 9 is, for example, a touch panel to which the user name and the password can be inputted. In this case, the user interface 33 (FIG. 2) of the MFP 1 has the functionality of the authentication unit. Alternatively, the authentication unit 9 may be an IC card reader. The authentication unit 9 may also be a biometric device. The biometric device measures physical features of an individual such as fingerprint, palm print, vein pattern, iris, retina, voice print, face form and ear form, or behavior features of an individual such as handwriting and key stroke, and compares the same with information registered beforehand, and identifies the individual.

The personal computers 5 and 7 configure respectively one of the terminal devices (information processing devices) according to the first embodiment of the present invention. Each of the personal computers 5 and 7 is a general computer device including a central processing unit (CPU), a main storage device (ROM, RAM), an auxiliary storage device (HDD), and an input/output device (display, keyboard, and mouse). The user creates print data using the PC 5, and transmits the print data to the MFP 1 via the network 3.

The terminal device according to the present embodiment does not need to be an information processing device having versatility such as a personal computer. A device capable of instructing the printout of the document to the image forming device suffices as the terminal device of the present embodiment.

The image forming system 100 may also include a server device (not shown).

The server device here is, for example, an authentication server. The authentication server is a server having a function of checking the user identification information (e.g., user ID) and the user authentication information (e.g., password, authentication data) transmitted from a client (e.g., MFP 1 and PC 5) with the user information and the user authentication information of the server device, determining success/fail of the user authentication, and returning the determination result to the client. The authentication server realizes the function of a user authentication unit 43 (FIG. 3) of the MFP 1. In this case, the user authentication unit 43 (FIG. 3) can be omitted from the MFP 1.

The server device is, for example, a data server. The data server is a server device having a function of holding data file of the document, data (print data) of the job to be transmitted to the MFP 1, job data held in the MFP 1, and the like, and transmitting the data file of the document, the print data, the job data and the like in response to a request from the client.

The server devices (not shown) are not essential elements of the image forming system 100. The MFP 1 and the PC 5 or 7 configuring the image forming system may have the function of the server, as necessary.

<Hardware Configuration of Image Forming Device>

Figure 2:
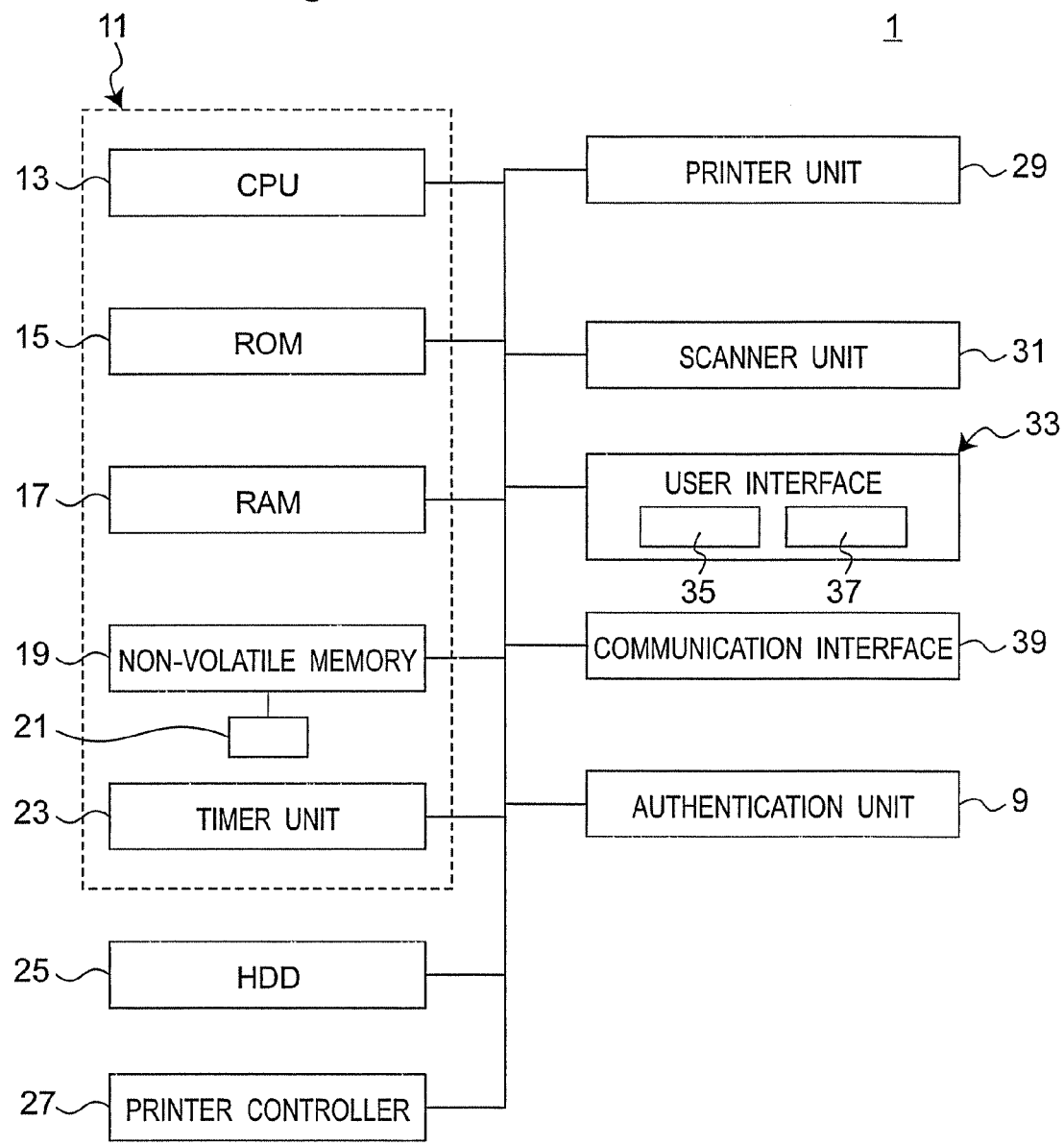
FIG. 2 is a block diagram of a hardware configuration of an MFP 1.

FIG. 2 is a block diagram showing a hardware configuration of the MFP 1.

The MFP 1 includes a central processing unit (CPU) 13, a read only memory (ROM) 15, a random access memory (RAM) 17, a non-volatile memory (NVRAM) 19, a compact power supply unit 21, a timer unit 23, a hard disk drive (HDD) 25, a printer controller 27, a printer unit 29, a scanner unit 31, a user interface 33, a communication interface 39, and the authentication unit 9. Such components are connected to each other by way of a data bus in the MFP 1.

The CPU 13 can execute an image forming program held in the ROM 15, the RAM 17, the NVRAM 19, or the HDD 25, or the image forming program provided through the communication interface 39, and process the data held in the ROM 15, the RAM 17, the NVRAM 19, or the HDD 25. The CPU 13, the ROM 15, the RAM 17, the NVRAM 19, and the timer unit 23 configure a computer main part 11 capable of executing the image forming program. The image forming program is executed by the main part 11, and thus the main part 11 has a function of controlling the MFP 1, the function of executing the calculation process, and the function of holding the data. The image forming program thus realizes the technical idea of the present invention by being executed on the MFP 1. The image forming program may be installed in the ROM 15 of the MFP 1 in advance. Alternatively, the image forming program may be provided to the MFP 1 through a storage medium such as flexible disk (FD), an optical disc, and a USB memory, or through a communication means such as the Internet.

The ROM 15, the RAM 17, the HDD 25, and the non-volatile memory 19 are storage devices for holding the data and the program. The MFP 1 appropriately uses such storage device group, and holds the data and the program that need to be held.

In the MFP 1 of the first embodiment, various MFP control programs and image forming programs are held in the ROM 15.

The RAM 17 configures a so-called working memory of the MFP 1. The RAM 17 is desirably an SRAM (Static Random Access Memory).

The NVRAM 19 is a storage device for holding various settings associated with image formation. The NVRAM 19 is connected to the compact power supply unit 21 for battery backup application.

The timer unit 23 has a timing function. The timer unit 23 is configured by a clock IC and the like.

In the MFP 1 of the first embodiment, the hard disk drive (HDD) 25 being the built-in storage device is arranged as the auxiliary storage device. The HDD 25 holds image data and job data by using a large-capacity storage region.

The printer controller 27 generates image data of a format that can be printed out by the printer unit 29 from the print data received by the communication interface 39.

The printer unit 29 receives the image data generated by the printer controller 27 and the like, and executes printout. The printer unit 29 forms an image on a printing medium such as paper. The printing medium subjected to image formation is discharged from the printer unit 29 as a printed material.

The scanner unit 31 photoelectrically reads (scans) the information recorded on the paper medium and the like, and outputs the image data of the relevant information.

The user interface 33 is a portion which carries out input/output of information between the MFP 1 and the user. The user interface 33 includes a display unit 35 for presenting information to the user, and an input unit 37 for accepting input of information from the user. The display unit 35 and the input unit 37 of the user interface 33 may be integrally configured using a liquid crystal touch panel. When executing the user authentication for the authentication print based on the information that can be input via the user interface 33 (e.g., key input of user name and password), the user interface 33 configures a predetermined authentication means for the authentication print printout process.

The communication interface 39 is an interface for transmitting and receiving data between the MFP 1 and the external device.

The authentication unit 9 is an information input device used in the user authentication for starting the execution of the printout in the authentication print printout process. The authentication unit 9 configures predetermined authentication means for the authentication print printout process in the present invention. The predetermined authentication means is not limited to the authentication unit 9. The user interface 33 may be used as the predetermined authentication means, as described above. In the present invention, one MFP 1 may include a plurality of types of devices as the predetermined authentication means.

The authentication unit 9 is an IC card reader, for example, for reading out information recorded on an IC card (smart card) possessed by the user. The IC card and the IC card reader may be configured using a well-known RFID (Radio Frequency Identification) technique. Alternatively, the authentication unit 9 is, for example, a biometric authentication device.

<Functional Configuration of Image Forming Device>

Figure 3:
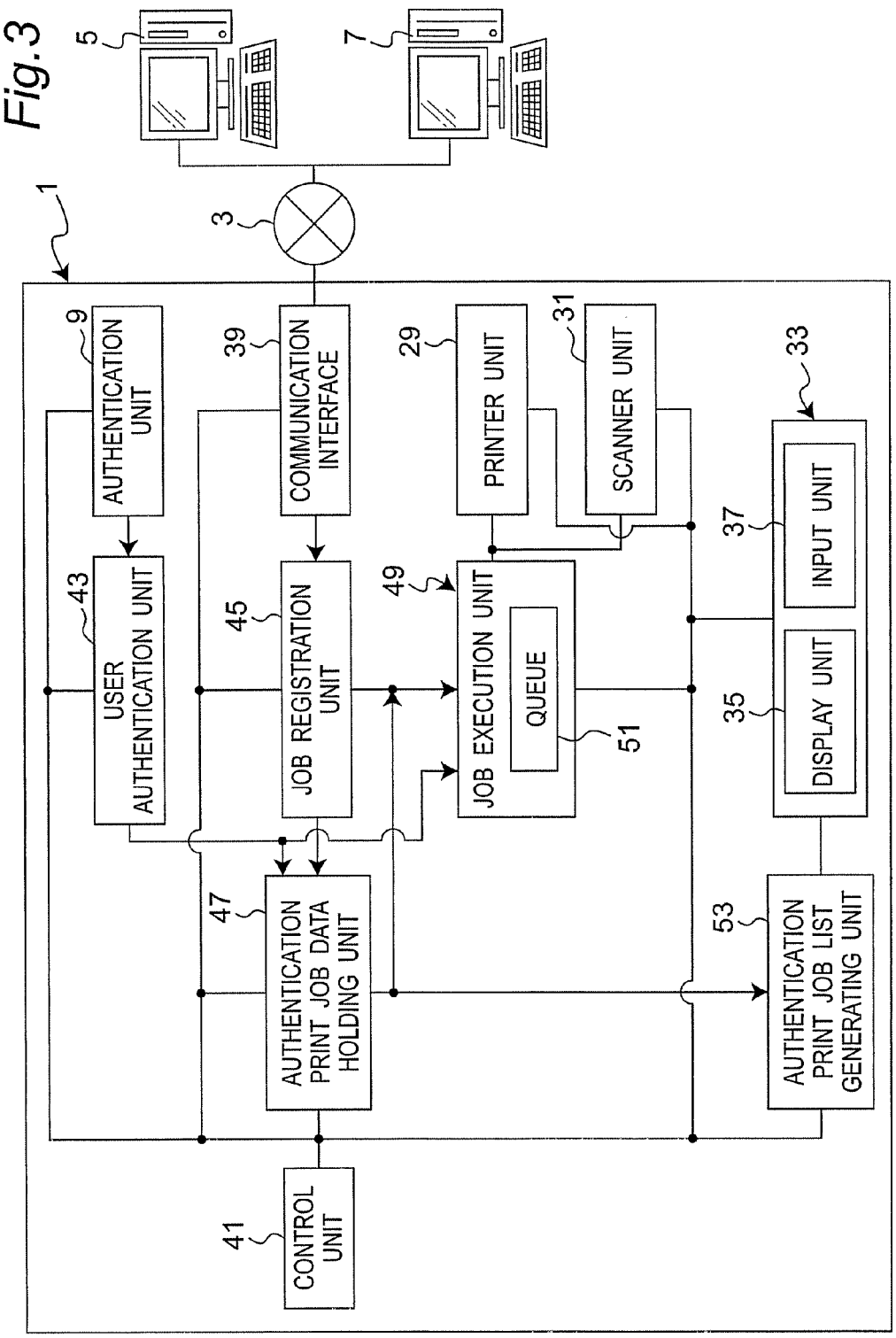
FIG. 3 is a block diagram of a functional configuration of the MFP 1.

FIG. 3 is a block diagram of a configuration of the MFP 1 using functional blocks. The illustration of the functions of the MFP 1 which is not related to the present embodiment is omitted. Some of the blocks are realized when the CPU 13 (FIG. 2) executes the image forming program and the like according to the present embodiment.

The MFP 1 includes a control unit 41. The control unit 41 is connected to each block of the MFP 1 so as to be able to transmit and receive data, keeps checking on a status of each block, and appropriately controls the operation of each block.

The communication interface 39 receives the print data from the PC 5 and the like via the network 3, as already described.

This print data has a data structure including data (set parameter data) related to the setting of the printout process, and data (document data) of the document to be printed out. The former, set parameter data, includes a parameter (authentication print set parameter) indicating whether or not to execute the printout process as the authentication print, data for authentication, and a parameter of the print mode (one-side/double side and the like). The data for authentication includes user identification code (so-called user name) of the user who transmitted the print data, the password corresponded with the user identification code, and the like. The data for authentication contained in the set parameter data of the print data (user identification code and password) are added to the print data by having the user input necessary information to the PC 5 and the like when creating the print data. The data for authentication is provided to prove that the print data is created by a true user. The data for authentication may also be used for the user authentication for the authentication print. The data structure of the print data will be hereinafter specifically described. The print data received by the communication interface 39 is sent to a job registration unit 45.

The job registration unit 45 references the set parameter data of the received print data, and acquires information (user name) and password of the owner of the printout process (print job) related to the print data from the user identification code (user name). The job registration unit 45 then checks the information (user name) and the password of the owner, develops the print data to the bitmap image data if the check result is "true," and generates the job data from the bitmap image data and the set parameter data. The job registration unit 45 holds (stores) the data (registered user information data) indicating the correspondence relationship of the user name and the password in advance for the user name-password check process (For instance, user name and password in a registered user management table 55 of FIG. 6). However, if the relevant registered user information data is held in a device exterior of the MFP 1, and the MFP 1 can access the relevant registered user information data, the MFP 1 does not need to internally hold (store) the registered user information data.

The job registration unit 45 references the authentication print set parameter of the set parameter data of the print data, and determines whether or not to perform the printout process on the job related to the relevant print data as authentication print. When the job registration unit 45 determines to execute the job as the authentication print job, the job data of the job is sent to an authentication print job data holding unit 47, and held (stored) in the authentication print job data holding unit 47 as authentication print job data. Here, the MFP 1 recognizes the authentication print job data held in the authentication print job data holding unit 47 until the user authentication for the authentication print is completed as job data in a temporarily suspended state (held (stored) state).

When the job registration unit 45 determines to execute the job as the normal printout process, which is not the authentication print, the job data of the job is immediately sent to a job execution unit 49, and the job is immediately executed or placed in a queue 51.

The authentication print job data holding unit 47 holds the authentication print job data until the user being the owner of the job data successfully completes the user authentication.

The job execution unit 49 executes the job based on the received job data. However, the job execution unit 49 places the job data in a queue 51 if the job related to the job data cannot be immediately executed at the point of receiving the job data. The MFP 1 recognizes the job data in execution as the job data in the execution state, and recognizes the job data in the queue 51 as the job data in the execution standby state (execution queueing state).

The user authentication unit 43 monitors the input of the input authentication data from the authentication unit 9. When the user authentication unit 43 receives the input of the input authentication data from the authentication unit 9, the user authentication unit 43 checks the inputted input authentication data and the data against the user authentication of the authentication print held in advance, determines success/fail of the user authentication, and outputs the determination result. Here, the data structure of the input authentication data merely needs to be appropriately selected according to the authentication method used in the user authentication. The input authentication data includes the user identification code (user name) and the user authentication data. The user authentication data may be password character string inputted by the user, the user authentication data held (stored) in the IC card, the biological features inherent to the user individual, and the like. Depending on the authentication method used in the user authentication, (e.g., in biometrics authentication,) only the user authentication data is needed as the input authentication data and the user name is not needed. The MFP 1 holds the user authentication data (password and the like) corresponding with the user identification code (user name) as the data for the user authentication of the authentication print (e.g., user name and authentication data for an authentication print in registered user management table 55 of FIG. 6).

An authentication print job list generating unit 53 generates a list of authentication print jobs that can be changed from the temporarily suspended state to the execution state or the execution standby state when determined that the user authentication is successful in the user authentication unit 43, and displays the list on the display unit 35 of the user interface 33.

In the first embodiment of the present invention, if the number of authentication print jobs that can be changed from the temporarily suspended state to the execution state (or execution standby state) when the predetermined user authentication for starting the execution of the authentication print job is successful is greater than or equal to a predetermined number such as two, the authentication print job list generating unit 53 generates the list of authentication print jobs and displays the list on the display unit 35 of the user interface 33.

In addition, in the MFP 1 according to the first embodiment of the present invention, when the authentication print job list generating unit 53 displays the list of authentication print jobs on the display unit 35, the user can reference the list and select the authentication print job desired to be executed from the list, and instruct the execution to the MFP 1.

In the first embodiment of the present invention, the authentication print job list generating unit 53 does not generate the list of authentication print jobs if the number of authentication print jobs to be changed from the temporarily suspended state to the execution state is less than the predetermined number such as two. In this case, the MFP 1 of the first embodiment of the present invention immediately changes the state of the authentication print job to the execution state or the execution standby state, and completes the printout process as fast as possible without waiting for the selection by the user.

<Image Forming Process Flow>

The flow of the image forming process in the MFP 1 according to the first embodiment of the present invention will now be described with reference to FIGS. 4 to 9.

Figure 4:
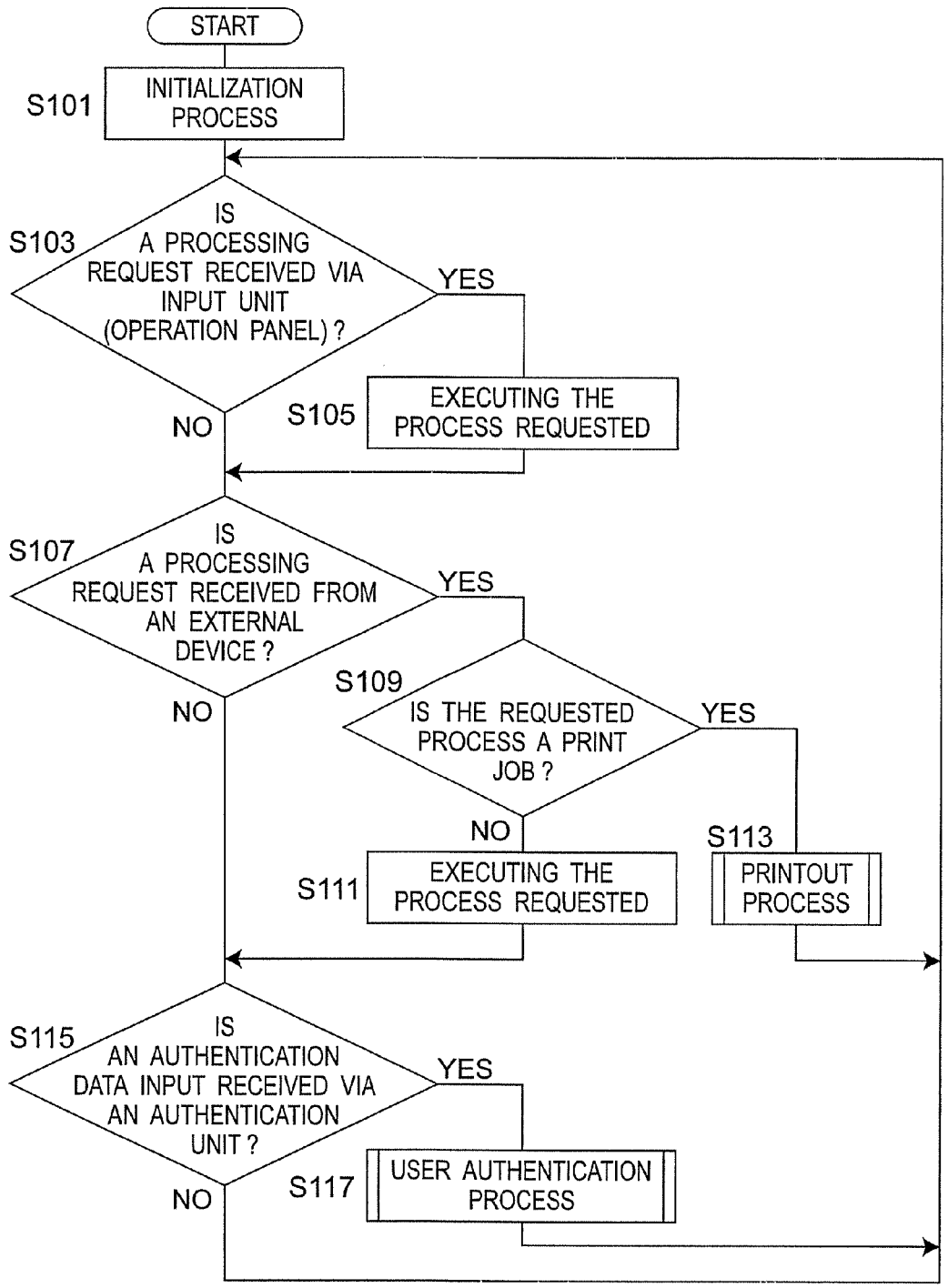
FIG. 4 is a flowchart of a process executed by the MFP 1.

First, FIG. 4 will be described. FIG. 4 is a flowchart of the entire flow of the process executed in the MFP 1.

For instance, the MFP 1 executes step S101 when the power is turned ON. In step S101, the MFP 1 executes an initialization process. The initialization process includes a process for clearing a memory, a process for resetting the operation mode to a standard setting, and the like.

In step S103, the MFP 1 checks the reception of an input of instructions from a user by way of the input unit 37 of the user interface 33. If the MFP 1 determines that the input of instruction from the user is received ("YES" in step S103), the process proceeds to step S105. If the MFP 1 determines that the input of instruction from the user is not received ("NO" in step S103), the process proceeds to step S107.

In step S105, the MFP 1 executes the process based on the instructions inputted through the input unit 37 by the user. For instance, the MFP 1 executes various jobs such as copy job and scan job, or executes various setting changing processes of the MFP 1 based on the instruction.

In step S107, the MFP 1 determines the reception of an input of instructions from an external device connected to the MFP 1 by way of the communication interface 39 and network. If the MFP 1 determines that the input of instructions from the external device is received ("YES" in step S107), the process proceeds to step S109. If the MFP 1 determines that the input of instructions from the external device is not received ("NO" in step S109), the process proceeds to step S115.

In step S109, the MFP 1 determines whether or not the content of the instructions (a request) from the external device includes a printout process (print job). If the MFP 1 determines that the relevant instructions include a print job ("YES" in step S109), the process proceeds to step S113. If the MFP 1 determines that the relevant instructions do not include a print job ("NO" in step S109), the process proceeds to step S111.

In step S111, the MFP 1 executes the process based on the instructions from the external device, similar to the process in step S105. After the relevant process is completed, the process proceeds to step S115.

In step S113, the MFP 1 executes the printout process based on the instructions from the external device.

<<Printout Process Flow>>

Figure 5:
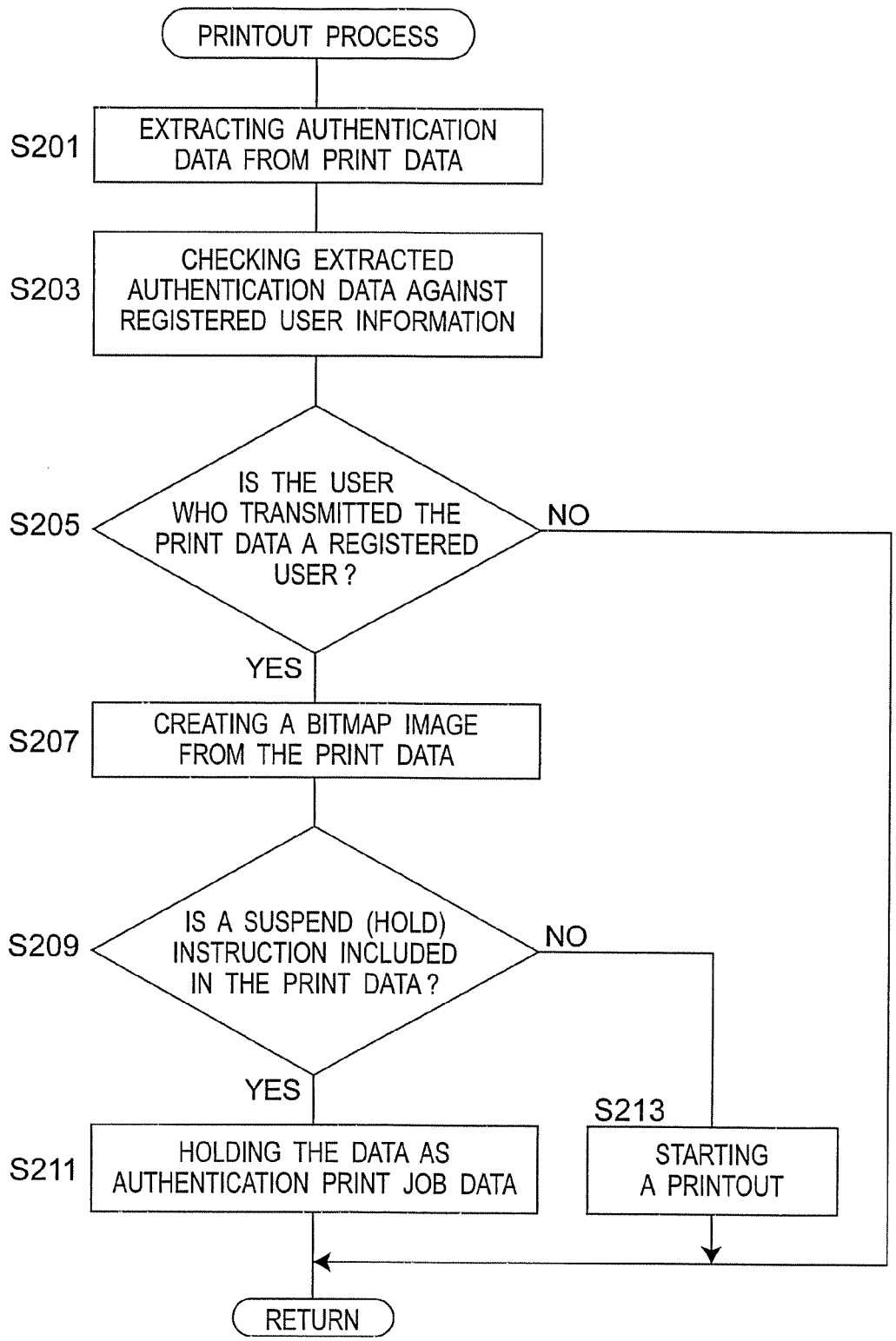
FIG. 5 is a flowchart of a printout process executed by the MFP 1.

FIG. 5 is a flowchart showing details of step S113.

With reference to FIG. 5, the job registration unit 45 (FIG. 3) of the MFP 1 extracts the data for authentication included in the set parameter data of the print data which is received from the external device in step S201.

In step S203, the job registration unit 45 compares the user name (user identification code) and the password included in the extracted data for authentication with the registered user information data held in advance. The method of the comparison herein may be a well-known method of comparing a password included in the data for authentication with a password included in the registered user information using a user name included in both of the data for authentication and the registered user information as a key.

FIG. 6 is an example of the registered user information data held by the MFP 1. In the MFP 1, the registered user information data is held in the registered user management table 55. The registered user management table 55 includes a column 55C1 of user name (user identification code), a column 55C2 of password, and a column 55C3 of data for the user authentication of the authentication print. In the column 55C3, authentication data for an authentication print, information regarding authentication data which is used for the user authentication of the authentication print is recorded. This information may be, for example, a file name of the authentication data used in the user authentication which is performed by using the IC card, or the biometrics authentication. When the user authentication for the authentication print is performed based on the information of the password 55C2, the column 55C3 of the authentication data for an authentication print is not an essential for registered user information data and, the registered user information data has only to include user name and password. In this case, the user may input a password using the input unit 37, or the password which is recorded on the IC card may be read out by the IC card reader. When performing biometrics authentication as the user authentication for the authentication print, the data file held in the column 55C3 may be a data file storing a template of biological characteristics.

Returning to FIG. 5, in step S205, the job registration unit 45 determines whether the user who transmitted the print data is the true user or not based on the comparison of step S203. If the job registration unit 45 determines that the user who transmitted the print data is the true user ("YES" in step S205), the process proceeds to step S207. If the job registration unit 45 determines that the user who transmitted the print data is not the true user ("NO" in step S205), the process returns to step S103 (FIG. 4).

In step S207, the MFP 1 creates bitmap image data to be used in a printout process from the received print data.

In step S209, the job registration unit 45 of the MFP 1 references the authentication print set parameter of the set parameter data of the received print data, and determines whether a printout process of a job related to the relevant print data is to be performed as a authentication print or not. In the authentication print set parameter of the present illustration, perform/not perform the authentication print is described as the parameter of ON/OFF setting of the instruction (hold instruction) to hold the job related to the print data in the temporarily suspended state (temporarily stored state) If the job registration unit 45 determines to execute the job related to the print data as the authentication print, that is, the hold instruction is ON ("YES" in step S209), the process proceeds to step S211. If the job registration unit 45 determines not to execute the job related to the print data as the authentication print, that is, the hold instruction is OFF ("NO" in step S209), the process proceeds to step S213.

In step S211, the MFP 1 creates job data based on the print data (bitmap image data created therefrom and set parameter data). The created job data is then transferred to the authentication print job data holding unit 47 as authentication print job data. The authentication print job data holding unit 47 holds (stores) the received authentication print job data. Here, the MFP 1 can recognize the job related to the authentication print job data as a job in the temporarily suspended state (temporarily stored state) in association with the information on the user or the owner of the job.

FIG. 7 is an exemplary view of an authentication print job data management table 57 created in the MFP 1 so that the MFP 1 can manage jobs in the temporarily suspended state (jobs related to the authentication print job data held in the authentication print job data holding unit 47).

The authentication print job data management table 57 includes a column 57C1 of job ID, a column 57C2 of user name, a column 57C3 of document name, a column 57C4 of received date and time, and a column 57C5 of job data name.

The job ID is an ID given to each job data by the MFP 1 to identify a job. For instance, an ID "0004" is given to the job of the authentication print job data created from the print data inputted by the user whose user name is "Sato" (57R3, 57C2). The relevant job is a job including a printout of the document name "document 3" as the authentication print, and it can be seen that the print data of the relevant job is received by the MFP 1 on "Aug. 10, 2007 09:15." Furthermore, the job data related to the relevant job is held as "satl.bin."

In step S213, the MFP 1 creates a job data based on the print data (bitmap image data created therefrom and set parameter data). The created job data is then transferred to the job execution unit 49. The job execution unit 49 executes the job based on the received job data. If the job execution unit 49 is in execution of another job at the point the job execution unit 49 receives the job data, the job data is placed in the queue 51. The MFP 1 recognizes the job related to the relevant job data as the job in the execution state or the execution standby state (execution queueing state).

FIG. 4 will be again referenced.

In step S115, the MFP 1 performs a check on the presence or absence of an input of input authentication data from the authentication unit 9. If the input of the input authentication data from the authentication unit 9 is made ("YES" in step S115), the process proceeds to step S117. If the input of the input authentication data from the authentication unit 9 is not made ("NO" in step S115), the process returns to step S103.

<<User Authentication Process Flow>>

Figure 8:
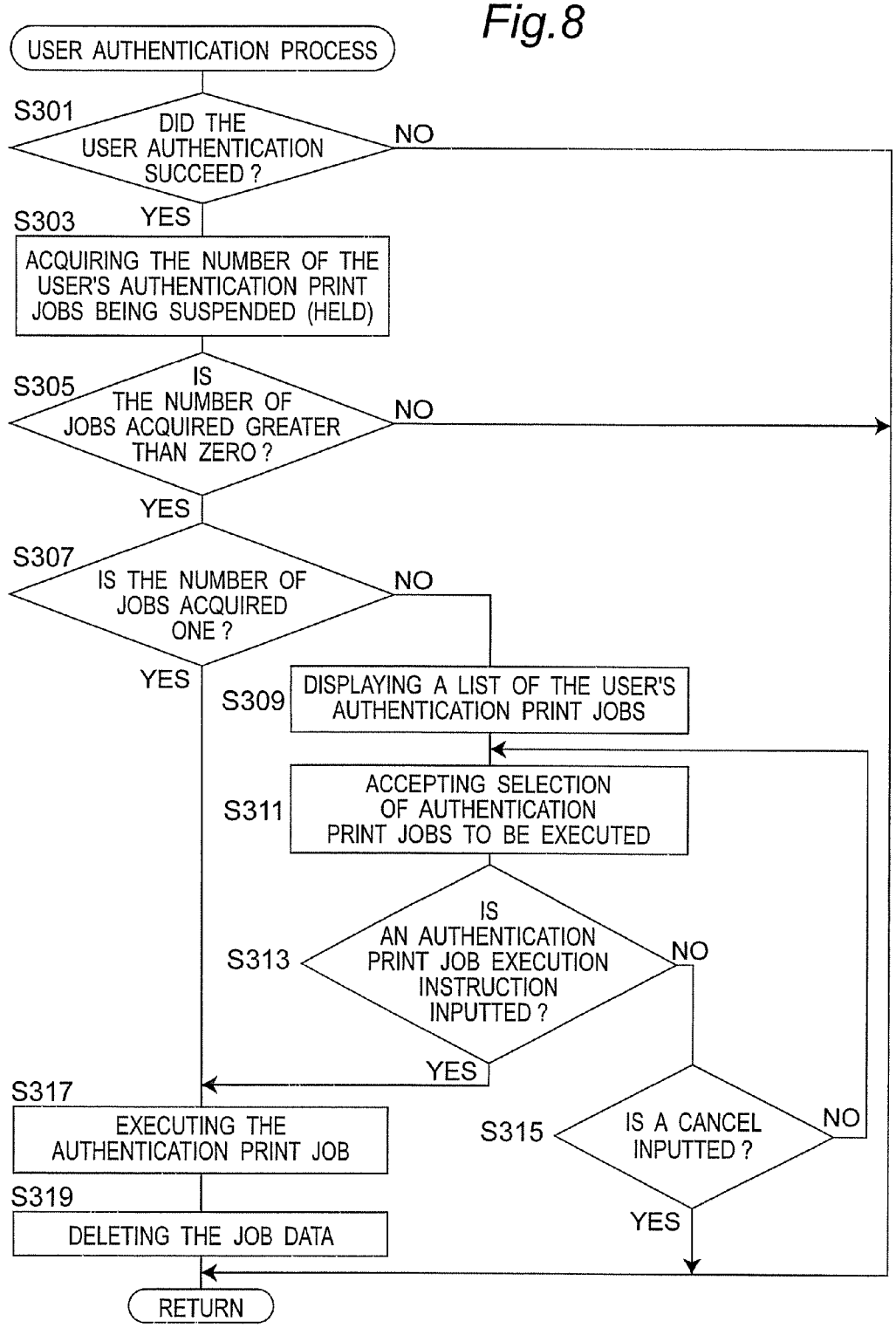
FIG. 8 is a flowchart of a user authentication process executed by the MFP 1.

FIG. 8 is a flowchart of details of step S117.

With reference to FIG. 8, the user authentication unit 43 (FIG. 3) of the MFP 1 checks the input authentication data from the authentication unit 9 with the data for the user authentication of the authentication print, and determines the success/fail of the user authentication in step S301. If the user authentication unit 43 determines that the user authentication is successful ("YES" in step S301), the process proceeds to step S303. If the user authentication unit 43 determines that the user authentication is fail ("NO" in step S301), the user authentication process is terminated and the process returns to step S103 (FIG. 4).

In step S303, the control unit 41 of the MFP 1 checks the number of job data in the temporarily suspended state (authentication print job data held in the authentication print job data holding unit 47) which includes the user name of the user related to the user authentication determined as successful in step S301, and acquires the number of such jobs.

In step S305, the control unit 41 of the MFP 1 determines whether or not the number of jobs acquired in step S303 is greater than zero. If determined that the number of jobs is greater than zero ("YES" in step S305), the process proceeds to step S307. If determined that the number of jobs is not greater than zero, that is, zero ("NO" in step S305), the user authentication process is terminated, and the process returns to step S103 (FIG. 4).

In step S307, the control unit 41 of the MFP 1 determines whether or not the number of jobs acquired in step S303 is one. If determined that the number of jobs is one ("YES" in step S307), the process proceeds to step S317. If determined that the number of jobs is not one, that is, greater than or equal to two ("NO" in step S307), the process proceeds to step S309. In the present embodiment, whether the number of jobs is one, or two or more is used as a judgment criterion. However, the number set as this value can be arbitrarily changed. The present invention has features in that the subsequent processes are branched with whether the number of jobs is smaller than a predetermined number being used as the judgment criterion or greater than or equal to this predetermined number.

In step S309, the authentication print job list generating unit 53 of the MFP 1 generates a list of authentication print jobs of the user who has succeeded in the user authentication, and displays the list on the display unit 35 of the user interface 33.

Figure 9:
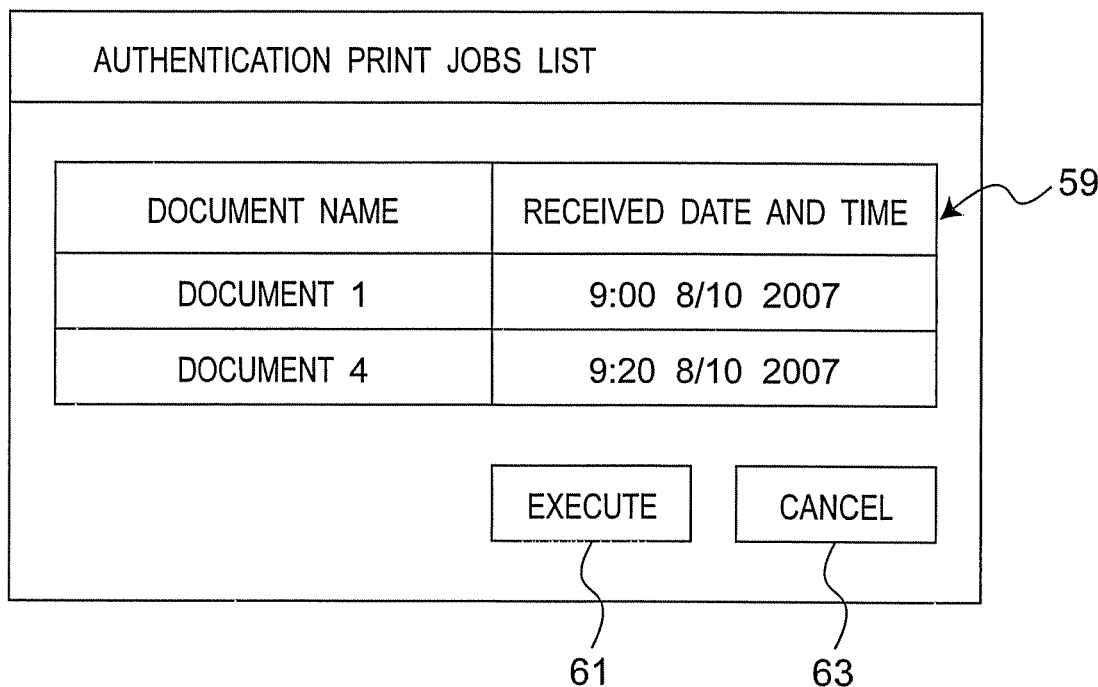
FIG. 9 is an exemplary diagram of a display of a list of authentication print jobs on a display unit 35.

FIG. 9 is an exemplary view of the authentication print job list 59 displayed on the display unit 35 in step S309. The present example is a display example of the list displayed when the user having the user name "Yamada" succeeded in the user authentication for the authentication print. Referencing FIG. 7 along with FIG. 9, the user name "Yamada" is included in the authentication print jobs having the job IDs "0001" and "0004". Therefore, in the authentication print job list 59 of the present example, the authentication print jobs related to "document 1" and "document 4" are displayed in the list. The display unit 35 of the present embodiment may be configured with a touch panel, and may also function as the input unit 37. The user can touch an arbitrary row in the list 59 and select the authentication print job displayed in the relevant row. Furthermore, the selection of the authentication print job can be canceled by touching again the selected row of the authentication print job. When the user selects a plurality of authentication print jobs, the execution order of the authentication print job can be inputted to the MFP 1 through the user interface 33. The method of inputting the execution order depends on the arbitrary method. For instance, the MFP 1 may adopt a method of storing the order of user's selection of the authentication print job as the execution order. Further, the display unit 35 (input unit 37) includes an execution button 61 and a cancel button 63.

Returning to FIG. 8, the control unit 41 of the MFP 1 accepts the user's selection of the authentication print job performed with the user interface 33 in step S311.

In step S313, the control unit 41 of the MFP 1 determines whether the execution button 61 is pushed by the user. If the control unit 41 determines that the execution button 61 is pushed by the user ("YES" in step S313), the process proceeds to step S317. If the control unit 41 determines that the execution button 61 is not pushed by the user ("NO" in step S313), the process proceeds to step S315.

In step S315, the control unit 41 determines whether the cancel button 63 is pushed by the user. If the control unit 41 determines that the cancel button 63 is pushed by the user ("YES" in step S315), the user authentication process is terminated, and process returns to step S103 (FIG. 4). If the control unit 41 determines that the cancel button 63 is not pushed by the user ("NO" in step S315), the process returns to step S311.

In step S317, the control unit 41 of the MFP 1 causes the job execution unit 49 to start the execution of the authentication print job. That is, in the MFP 1, the authentication print job is substantially immediately executed after the determination of the user authentication in step S301 when step S317 is directly executed from step S307, whereas the selected authentication print job is executed in receiving the instructions to select and execute the authentication print job by the user when step S317 is executed after step S313 from step S307.

In step S319, the MFP 1 deletes the job data of the authentication print job completed with the execution, and terminates the user authentication process.

In the MFP 1 according to the present embodiment, the user can select the authentication print job to actually execute from the plurality of authentication print jobs displayed in the list if the plurality of authentication print jobs are in a temporarily suspended state. In selecting the authentication print job to be executed actually, the user may specify the execution order among the selected plurality of authentication print jobs. The MFP 1 immediately executes the printout process when the number of authentication print jobs in the temporarily suspended state is smaller than the predetermined number such as one.

Second Embodiment

Figure 10:
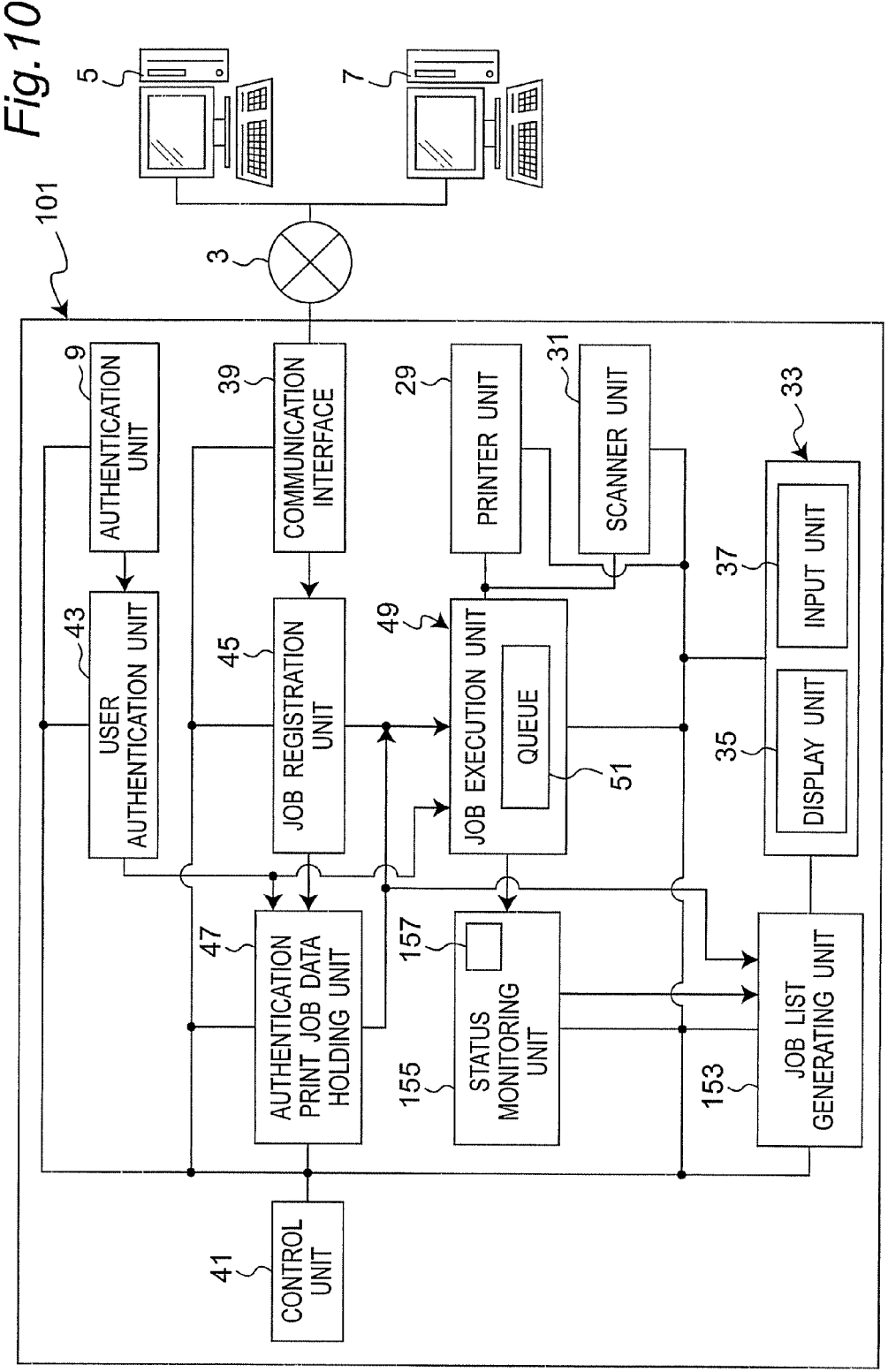
FIG. 10 is a block diagram of a functional configuration of an MFP 101.

An image forming device according to a second embodiment of the present invention will now be described. FIG. 10 is a block diagram of a functional configuration of an image forming device, an MFP 101, of the second embodiment. The blocks having similar function as the MFP 1 of the first embodiment are denoted with similar reference numerals, and the description will be omitted.

Similar to the MFP 1, the MFP 101 can configure the image forming system 100 (FIG. 1). The hardware configuration of the MFP 101 may be the same as that of the MFP 1.

With reference to FIG. 10, the MFP 101 includes a status monitoring unit 155 in addition to the function blocks of the MFP 1. The MFP 101 also includes a job list generating unit 153 in place of the authentication print job list generating unit 53 of the MFP 1.

The status monitoring unit 155 monitors the status of the job execution unit 49 (and queue 51) of the MFP 101. The status monitoring unit 155 monitors the job execution unit 49 and the queue 51 so that the control unit 41 of the MFP 101 can recognize whether or not a job in execution and/or in execution standby exists in the MFP 101.

The status monitoring unit 155 creates a status monitoring table 157 (FIG. 12) therein by monitoring the status of the job execution unit 49 (and queue 51).

Similar to the authentication print job list generating unit 53 according to the first embodiment, the job list generating unit 153 generates a list of authentication print jobs owned by the user who succeeded in the user authentication, and displays the list on the display unit 35. In addition to the function of the authentication print job list generating unit 53 according to the first embodiment, the job list generating unit 153 can also generate a list of jobs in the execution state or the execution standby state existing in the job execution unit 49 or the queue 51, and display this list simultaneously with the list of authentication print jobs on the display unit 35.

Figure 11:
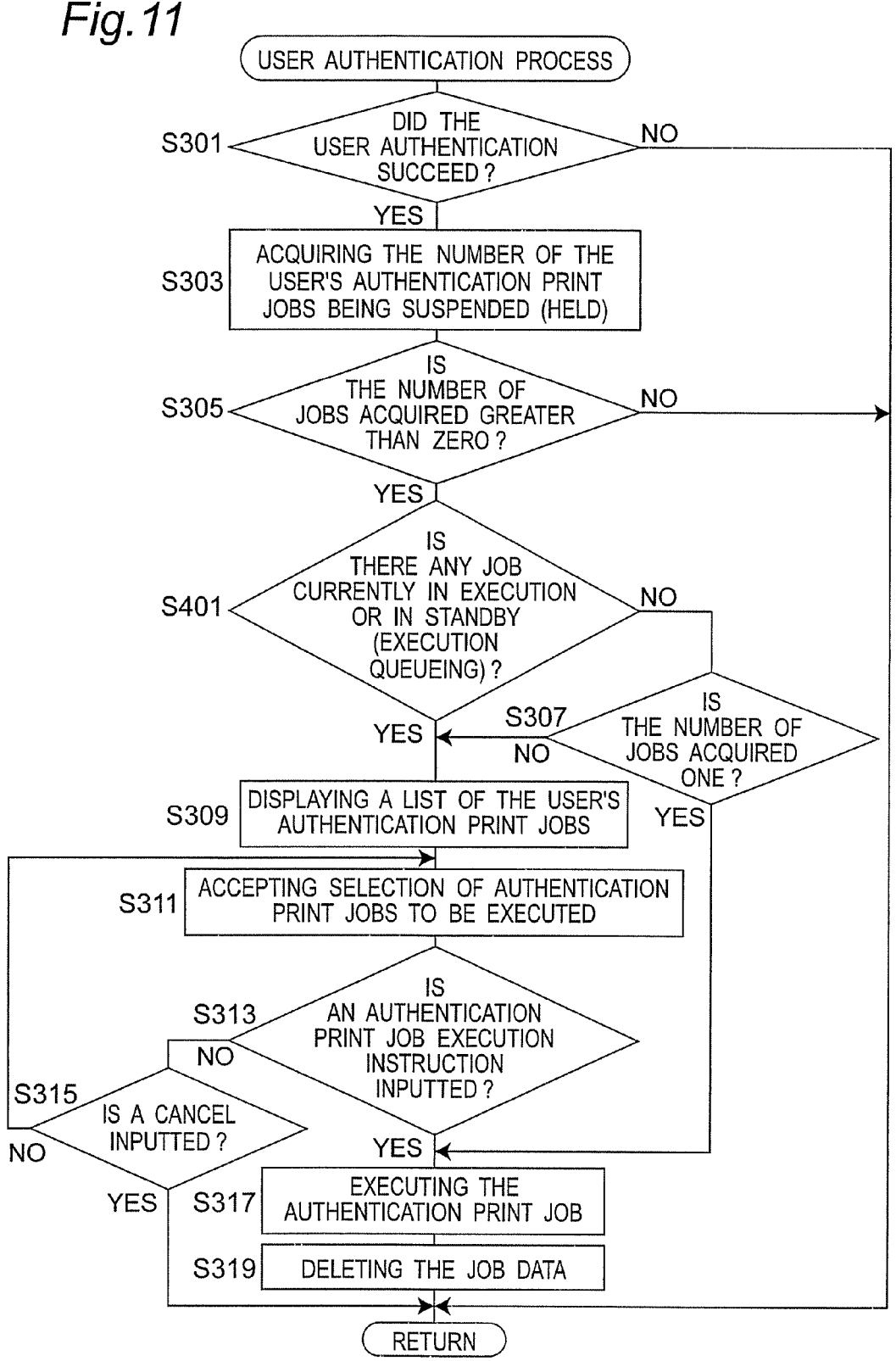
FIG. 11 is a flowchart of a user authentication process executed by the MFP 101.

FIG. 11 is a flowchart of details of the user authentication process executed in the MFP 101.

The user authentication process executed in the MFP 101 differs from the user authentication process (FIG. 8) executed in the MFP 1 in regards to step S401. In FIG. 11, same step reference numbers are denoted for steps similar to the steps shown in FIG. 8. Here, the description will be omitted on the steps similar to the steps already described with reference to FIG. 8.

In step S401, the control unit 41 of the MFP 101 recognizes the status of the job execution unit 49 by referencing the status monitoring table 157 created by the status monitoring unit 155.

FIG. 12 is an exemplary diagram of the status monitoring table 157 created by the status monitoring unit 155. The status of the job execution unit 49 shown in the figure shows that, currently, the job of job ID "0008" is in the execution state as shown in row 157R1, and the jobs of job ID "0009" (row 157R2) and "0010" (row 157R3) are in the execution standby state (the state of being held in queue 51).

The control unit 41 of the MFP 101 determines whether or not a job in the execution state and/or the job in the execution standby state exists in the job execution unit 49 based on the status monitoring table 157. It should be noted that the control unit 41 determines the status of the job execution unit 49 in consideration of the execution state/execution standby state due to any print job in which a job other than the authentication print job which is related to the user who succeeded in the user authentication is included. If the control unit 41 determines that the job execution unit 49 is in execution of the job or the job in the execution standby state exists in the job execution unit 49 ("YES" in step S401), the process proceeds to step S309. If the control unit 41 determines that the job execution unit 49 is not executing a job and a job in the execution standby state does not exist in the job execution unit 49 ("NO" in step S401), the process proceeds to step S307.

Similar to step S309 of the first embodiment, a list of authentication print jobs owned by the user who has successfully completed the user authentication is generated and displayed on the display unit 35 in step S309. Here, the job currently in the execution state or the execution standby state in the job execution unit 49 may also be displayed.

Therefore, in the MFP 101 of the second embodiment, if the job execution unit 49 is in execution of another job or another job is being held in the job execution unit 49 even when the number of authentication print jobs related to the user who succeeded in the user authentication is less than a predetermined number such as one, the list of jobs is displayed, and notification can be made to the user that the authentication print job of the related user is appropriately processed in the MFP 101 and placed in the queue 51. Thus, the user can know that his/her authentication print job has been appropriately processed in the MFP 101 without any special or additional operation and without waiting for the discharge of printed material of the document according to the authentication print job. Thus, the user can immediately start the necessary operation even if the relevant authentication print job is not appropriately processed in the MFP 101. Therefore, the lowering in productivity of the image forming device due to an inappropriate event can be suppressed to a minimum.

(Data Structure of Print Data)

An example of print data that can be used in the image forming device according to the embodiments of the present invention will be described below. The present example is shown only for illustrative purpose. In the embodiments of the present invention, the print data having various data structures, which are not shown herein, may be used.

The print data is created by a printer driver running on the information processing device such as the PC 5. The print data is configured by commands described in a printer job language (PJL). A command specifying the page description language (PDL) is inserted in the PJL commands, and thereafter, the print commands described in the PDL will now be described.

The following is an example of the print data when the PCL (Printer Control Language) is used as the PDL.

% -12345X@PJL /Start of PJL
@PJL JOB NAME="Document 1" /print job name
@PJL SET USERNAME="Yamada" /user identification code (user name)
@PJL SET USERPASS="QWER019" /password
@PJL SET HOLD=ON /hold this job in a suspended state
@PJL ENTER LANGUAGE=PCL/select PCL for language
{Data of document} /data of document
% -12345X /end of PJL The second row to the fifth row of the present example configure the set parameter data of the present invention. The third row and the fourth row configure the data for authentication. The fifth row of the present example is the command specifying whether the job is to be held in the temporarily suspended state or not. That is, the fifth row configures the authentication print set parameter. The seventh row is data of the document to be printed described using the selected PDL.

When processing the job as a normal printout process, the fifth row is described as "@PJL SET HOLD=OFF."

In addition to the PCL, the PDL includes PostScript, and file format such as PDF, TIFF, JPEG, and XPS.

The present invention is an image forming device in which operability and productivity are enhanced while ensuring the security related to the printed material to be discharged. The present invention is useful in image formation field.

What is claimed is:

1. An image forming device which is arranged to execute an authentication print job being a print job in which a user authentication is performed using a predetermined authentication device and a start of execution of a printout process is determined based on a result of the user authentication, the image forming device comprising:
   a communication interface unit that is arranged to receive print data related to a print job;
   a job data holding unit that is arranged to hold job data based on the print data for the authentication print job;
   a user authentication unit that is arranged to output a result of the user authentication using the predetermined authentication device to a control unit;
   a job execution unit that is arranged to execute a job based on the job data;
   a job list generating unit that is arranged to generate a list of the authentication print jobs related to the job data held by said job data holding unit;
   a display unit that is arranged to display the list of the authentication print jobs generated by said job list generating unit; and
   the control unit is arranged to, in receiving the result of the user authentication outputted by said user authentication unit, acquire a number of authentication print jobs related to the job data held by said job data holding unit of the user authenticated by the user authentication using the predetermined authentication device; and
   a status monitoring unit that is arranged to monitor a status of the job execution unit and output the status to said control unit, wherein
   when the number of the authentication print jobs of the authenticated user acquired by said control unit is greater than or equal to two, said control unit causes said job list generating unit to generate the list of the authentication print jobs of the authenticated user, said display unit to display the list of authentication print jobs of the authenticated user generated by said job list generating unit, and said job execution unit to execute the authentication print job selected by the authenticated user from the displayed list of the authentication print jobs,
   when the number of the authenticated print jobs of the authenticated user acquired by said control unit is equal to one, said control unit causes said job execution unit to execute the authentication print job of the authenticated user without displaying the list of authentication print jobs of the authenticated user generated by said job list generating unit, and
   when the status of the job execution unit monitored by the status monitoring unit is any one of execution state and execution standby state at least, the control unit causes, regardless of the number of the authentication print jobs of the authenticated user, the job list generating unit to generate the list of the authentication print jobs of the authenticated user and the display unit to display the list of the authentication print jobs of the authenticated user generated by said job list generating unit.

2. The image forming device according to claim 1, further comprising an input unit that is arranged to receive an input information inputted by a user, and
   wherein said control unit receives an input related to a selection of the authentication print job of the authenticated user displayed in the list on said display unit through said input unit, and causes said job execution unit to execute the selected authentication print job of the authenticated user based on the input related to the selection.

3. The image forming device according to claim 2, wherein said control unit receives an input related to an execution order of the selected authentication print job of the authenticated user from said input unit, and causes said job execution unit to execute the selected authentication print jobs of the authenticated user based on the input related to the selection and the input related to the execution order.

4. The image forming device according to claim 2, wherein said predetermined authentication device is an IC card reader.

5. The image forming device according to claim 2, wherein said predetermined authentication device is a biometrics authentication device.

6. An image forming method in an image forming device which is arranged to execute an authentication print job being a print job in which a user authentication is performed using a predetermined authentication device and a start of execution of a printout process is determined based on a result of the user authentication, the image forming method comprising:
   receiving print data related to a print job by a communication interface unit;
   holding job data based on the print data for the authentication print job by a job data holding unit;
   outputting the result of the user authentication using the predetermined authentication device to a control unit by a user authentication unit;
   acquiring, in receiving the result of the user authentication outputted by the user authentication unit, a number of the authentication print jobs related to the job data held by the job data holding unit of the user authenticated by the user; authentication using the predetermined authentication device by the control unit; and monitoring, via a status monitoring unit, a status of job execution by a job execution unit, and outputting the status to said control unit;

determining whether or not the acquired number of the authentication print jobs of the authenticated user is greater than or equal to two, and wherein, when the acquired number of the authentication print jobs of the authenticated user is greater than or equal to two, the control unit causes a job list generating unit to generate a list of the authentication print jobs of the authenticated user, the display unit to display the list of the authentication print jobs of the authenticated user generated by the job list generating unit, and the job execution unit to execute the authentication print job selected by the authenticated user from the displayed list of the authentication print jobs, when the number of the authenticated print jobs of the authenticated user acquired by said control unit is equal to one, said control unit causes said job execution unit to execute the authentication print job of the authenticated user without displaying the list of authentication print jobs of the authenticated user generated by said job list generating unit, and when the status of the job execution unit monitored by the status monitoring unit is any one of execution state and execution standby state at least, the control unit causes, regardless of the number of the authentication print jobs of the authenticated user, the job list generating unit to generate the list of the authentication print jobs of the authenticated user and the display unit to display the list of the authentication print jobs of the authenticated user generated by said job list generating unit.

7. A non-transitory computer readable medium storing an image forming program executable by a computer in an image forming device which is arranged to execute an authentication print job being a print job in which a user authentication is performed using a predetermined authentication device and start of execution of a printout process is determined based on a result of the user authentication, the image forming program comprising:

code that causes a communication interface unit to receive print data related to a print job;

code that causes a job data holding unit to hold job data based on the print data for the authentication print job;

code that causes a user authentication unit to output the result of the user authentication using the predetermined authentication device to a control unit;

code that causes the control unit to acquire, in receiving the result of the user authentication outputted by the user authentication unit, a number of the authentication print jobs related to the job data held by the job data holding unit of the user authenticated by the user authentication using the predetermined authentication device;

code that causes a status monitoring unit to monitor a status of job execution by a job execution unit, and to output the status to said control unit; and code that causes the control unit to determine whether or not the acquired number of the authentication print jobs of the authenticated user is greater than or equal to two, wherein, when it is determined that the acquired number of the authentication print jobs of the authenticated user is greater than or equal to two, the control unit causes the job list generating unit to generate the list of the authentication print jobs of the authenticated user, the display unit to display the list of the authentication print jobs of the authenticated user generated by the job list generating unit, and the job execution unit to execute the authentication print job selected by the authenticated user from the displayed list of the authentication print jobs, when the number of the authenticated print jobs of the authenticated user acquired by said control unit is equal to one, said control unit causes said job execution unit to execute the authentication print job of the authenticated user without displaying the list of authentication print jobs of the authenticated user generated by said job list generating unit, and when the status of the job execution unit monitored by the status monitoring unit is any one of execution state and execution standby state at least, the control unit causes, regardless of the number of the authentication print jobs of the authenticated user, the job list generating unit to generate the list of the authentication print jobs of the authenticated user and the display unit to display the list of the authentication print jobs of the authenticated user generated by said job list generating unit.

* * * * *